United States Patent
Conroy et al.

(10) Patent No.: US 8,763,791 B2
(45) Date of Patent: Jul. 1, 2014

(54) AERIAL CONVEYOR SYSTEM

(76) Inventors: Jeffrey A. Conroy, Pittsburgh, PA (US); Michael Schimmelpfennig, St. Louis, MO (US)

(*) Notice: Subject to any disclaimer, the term of this patent is extended or adjusted under 35 U.S.C. 154(b) by 49 days.

(21) Appl. No.: 13/601,750

(22) Filed: Aug. 31, 2012

(65) Prior Publication Data
US 2013/0233675 A1    Sep. 12, 2013

Related U.S. Application Data

(60) Provisional application No. 61/530,150, filed on Sep. 1, 2011.

(51) Int. Cl.
*B65G 15/08* (2006.01)
*B65G 39/14* (2006.01)
*B65G 41/00* (2006.01)

(52) U.S. Cl.
CPC ............ *B65G 39/145* (2013.01); *B65G 41/002* (2013.01)
USPC .......................................... 198/819; 198/828

(58) Field of Classification Search
CPC ........ B65G 15/05; B65G 21/00; B65G 21/08; B65G 39/12; B65G 41/002; B65G 39/145
USPC ...................... 198/819–830, 860.1
See application file for complete search history.

(56) References Cited

U.S. PATENT DOCUMENTS

| | | | | |
|---|---|---|---|---|
| 2,897,564 A * | 8/1959 | Hardy | ...................... | 24/134 R |
| 2,907,448 A * | 10/1959 | Gleeson | ...................... | 198/827 |
| 3,010,566 A * | 11/1961 | Lo Presti | ...................... | 198/827 |
| 3,324,806 A * | 6/1967 | Olsen | ...................... | 198/819 |
| 3,887,061 A * | 6/1975 | Hopkins | ...................... | 198/304 |
| 4,101,019 A * | 7/1978 | Satterwhite | ...................... | 198/300 |
| 4,234,073 A * | 11/1980 | Satterwhite | ...................... | 198/304 |
| 4,261,460 A * | 4/1981 | Peterson, II | ...................... | 198/828 |
| 4,524,864 A * | 6/1985 | Peterson, II | ...................... | 198/828 |
| 8,177,055 B2 * | 5/2012 | Zamorano | ...................... | 198/828 |

* cited by examiner

*Primary Examiner* — James R Bidwell
(74) *Attorney, Agent, or Firm* — Foley & Lardner LLP

(57) ABSTRACT

An aerial conveyor system for transporting bulk materials is provided. The aerial conveyor system includes, among other things, a first anchor tower disposed proximate to a loading end, a second anchor tower disposed proximate to a discharge end, at least one support cable extending between the first anchor tower and the second anchor tower, a belt conveyor system extending between the loading end and the discharge end and at least one pivot tower disposed between the first anchor tower and the second anchor tower. The at least one pivot tower includes a support structure connected to the at least one support cable, a base and a pivot structure configured to allow the support structure to pivot relative to the base to substantially equalize dynamic tensions of the at least one support cable between the first anchor tower and the pivot tower and the second anchor tower and the pivot tower.

20 Claims, 5 Drawing Sheets

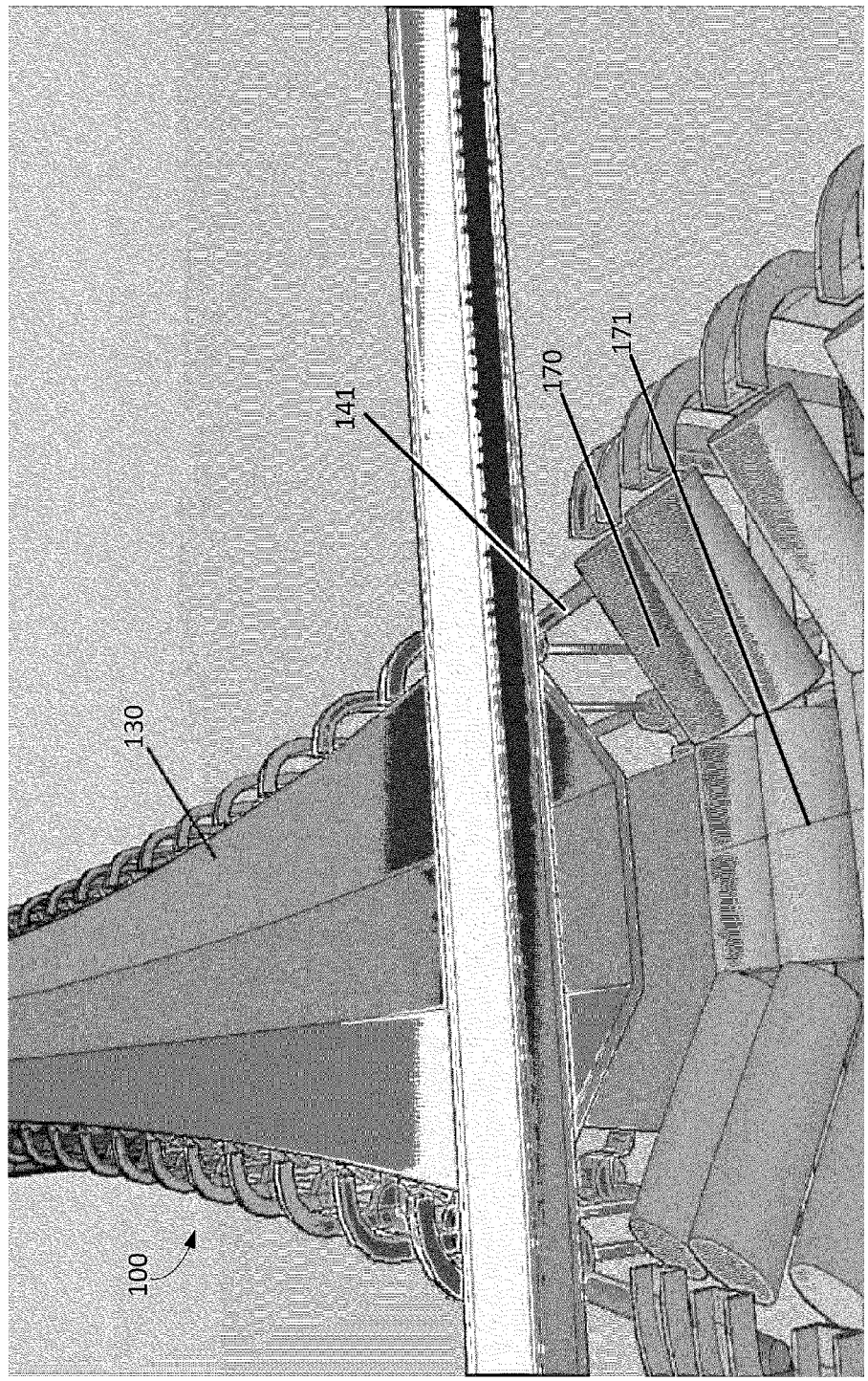

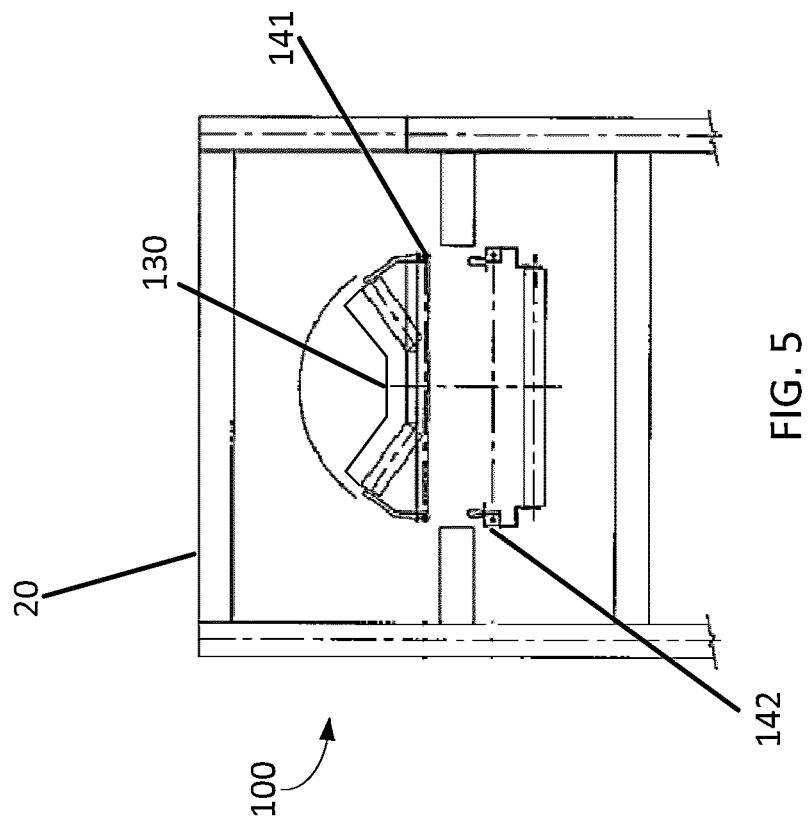
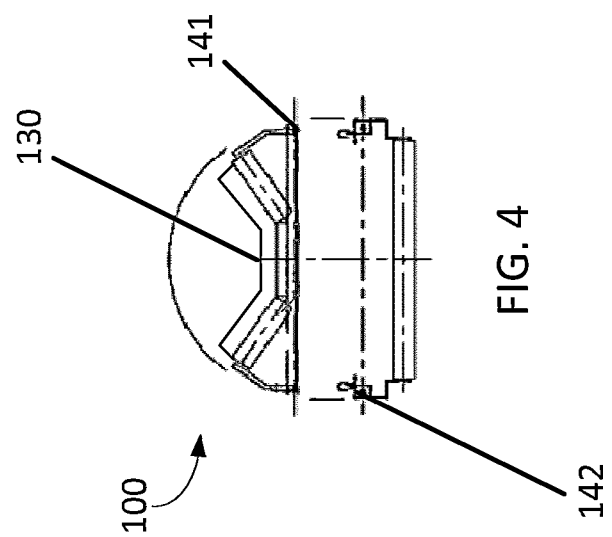

AERIAL CONVEYOR SYSTEM

CROSS-REFERENCE TO RELATED PATENT APPLICATIONS

This application claims the benefit under 35 U.S.C. §119(e) of U.S. Provisional Application 61/530,150, filed on Sep. 1, 2011, the contents of which are hereby incorporated by reference in their entirety into the present disclosure.

BACKGROUND

1. Field of Embodiments

The disclosed embodiments relate generally to conveyor systems and, more particularly, to aerial belt conveyor systems with at least one pivot tower.

2. Description of Related Art

Coal conveyors are widely used in the coal mining industry. They can be used, for example to convey raw coal or coal ore stones. Coal conveyors can save labor and improve efficiency by moving large volumes of material. One type of coal conveyor is a belt conveyor. Belt conveyors typically include a long belt supported by a support structure, such as a metal frame. Rollers often are disposed at least at ends of the system. The belt is looped around each of the end rollers, one or more of which is powered to drive the belt across the metal frame, thereby moving the material.

Typical coal conveyors can be expensive to implement. For example, a typical truss conveyor often has a large amount of structural steel.

Typical coal conveyors also can be difficult to install. Because they are disposed on the ground and extend over a long span, it can be difficult to traverse roads, railroad crossings, and rough terrain. Installation can sometimes require the use of longer, alternative routes to avoid difficult to traverse areas.

Coal conveyors also can have a significant environmental impact. For example, the long conveyor can be a barrier to wildlife. It also may extend through environmentally sensitive areas, such as wetlands and rivers.

SUMMARY

One embodiment described herein relates to an aerial conveyor system for transporting bulk materials is provided. The aerial conveyor system includes, among other things, a first anchor tower disposed proximate to a loading end, a second anchor tower disposed proximate to a discharge end, at least one support cable extending between the first anchor tower and the second anchor tower, a belt conveyor system extending between the loading end and the discharge end and at least one pivot tower disposed between the first anchor tower and the second anchor tower. The at least one pivot tower includes a support structure connected to the at least one support cable, a base and a pivot structure configured to allow the support structure to pivot relative to the base to substantially equalize dynamic tensions of the at least one support cable between the first anchor tower and the pivot tower and the second anchor tower and the pivot tower.

Another embodiment described herein relates to a method of aerially transporting bulk materials. The method includes loading the bulk materials onto a belt conveyor system at a loading end and conveying the bulk materials from a first anchor tower disposed proximate to the loading end to a second anchor tower disposed proximate to a discharge end via the belt conveyor system and at least one support cable extending between the first anchor tower and the second anchor tower. The method also includes providing at least one pivot tower between the first and the second anchor towers, the at least one pivot tower including a support structure connected to the at least one support cable, a base and a pivot structure. The method also includes substantially equalizing dynamic tensions of the at least one support cable between the first anchor tower and the at least one pivot tower and the second anchor tower and the at least one pivot tower by pivoting the support structure to pivot relative to the base via the pivot structure of the at least one pivot tower. The method further includes discharging the bulk materials from the belt conveyor system at the discharge end.

BRIEF DESCRIPTION OF THE DRAWINGS

Features, aspects and advantages of the disclosed embodiments will become apparent from the following description and the accompanying exemplary embodiments shown in the drawings, which are briefly described below.

FIG. 3 is a perspective view of an embodiment of a belt as supported on rollers in the aerial conveyor system of FIG. 1.

FIG. 4 is a front view of the embodiment of the belt and rollers of the aerial conveyor system of FIG. 3 at mid span.

FIG. 5 is a front view of the embodiment of the belt of the aerial conveyor system of FIG. 3 at an anchor tower or a pivot tower.

DETAILED DESCRIPTION

Figure 1:
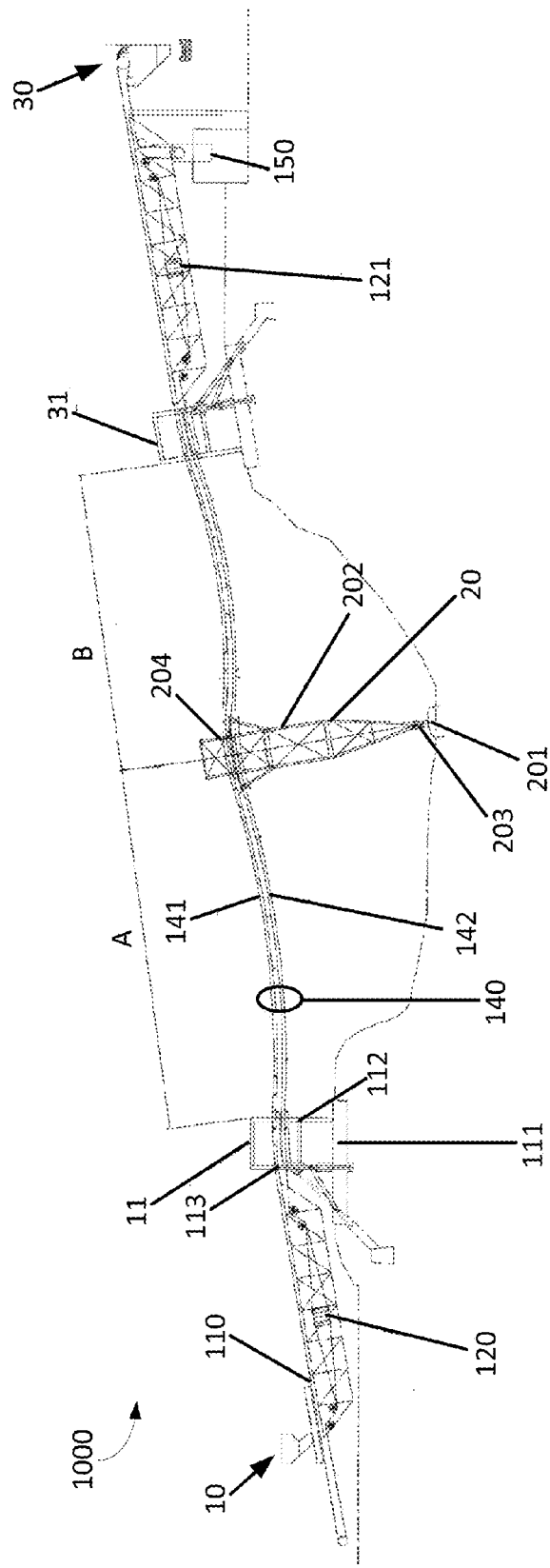
FIG. 1 is a side view of an embodiment of an aerial conveyor system.

Presently preferred embodiments are illustrated in the drawings. The disclosure relates to an aerial conveyor system. Preferably the aerial conveyor system can be used to transport coal, however, it can be used to transport other materials, such as gold, iron ore, aggregates, cargo, etc.

As shown in FIG. 1, an aerial conveyor system 1000 according to an exemplary embodiment can include, among other things, an anchor tower 11 proximate to a loading end 10, one or more pivot towers 20, and an anchor tower 31 proximate to a discharge end 30. Support cables 140 can extend between the anchor towers 11, 31 and the pivot tower(s) 20 to hold the pivot tower(s) 20 in position. While the anchor towers 11, 31 and pivot tower 20 are shown in FIG. 1 as being affixed to the ground, it is recognized that they could be fixed to other locations. For example, an anchor tower 11 may be affixed to a ship at the loading end 10 so that cargo can be unloaded from the ship. As a further example, the pivot tower 20 may be affixed to a ship to facilitate the aerial conveyor system 1000 in spanning a large body of water.

One or more support cables 140 also can be used to support a belt conveyor system 100, as described in more detail below. Preferably each individual support cable 140 is a single, continuous cable extending from the anchor tower 11 to the anchor tower 31. However, a support cable 140 can be discrete sections with one section extending between the anchor tower 11 and the adjacent pivot tower 20, and another section extending between the anchor tower 31 and the adjacent pivot tower 20.

The anchor towers 11, 31 can be disposed proximate to the loading end 10 and the discharge end 30, respectively. The anchor towers 11, 31 are rigidly fixed in position and are configured to be sufficiently robust so as to hold the support cables 140 and maintain the position of the pivot tower(s) 20. The anchor towers 11, 31 can be formed from structural steel in manner that is known to one of ordinary skill in the art. The anchor towers 11, 31 may include conventional anchoring structure. For example, with regard to the anchor tower 11, it may include a base 111 and a support structure 112. In addition, the anchor towers 11, 31 may include connection structure 113 that connects the anchor tower 11, 31 to and supports the belt conveyor system 100, as will be described in more detail below.

The belt conveyor system 100 may include a belt 130, a belt conveyor 110 for driving the belt 130, and a frame 160 for supporting the belt 130. At the loading end 10, conventional structure can be provided to load the material to be conveyed onto the belt 130. In addition, a known return belt rotator 120 can be provided at the loading end 10 to rotate the inbound belt 130 of the belt conveyor 110 and return it to a normal, outbound position in which it can be used to convey material. The power to drive the belt conveyor 110 can be provided by conventional structure at one or both of the belt rotator 120 and a belt rotator 121 (described below) or at some other location.

At the discharge end 30, conventional structure can be provided to unload the conveyed material from belt conveyor 110. An additional known return belt rotator 121 can be provided at the discharge end 30 to rotate the inbound belt 130 of the belt conveyor 110 and return it to a normal, outbound position. A counter weight 150 can also be provided at the discharge end 30 to provide a constant, desired belt tension.

A pivot tower 20 may be disposed between the anchor towers 11, 31. The pivot tower 20 can be configured to pivot about its base 201, in a manner known in the art. The ability to pivot is particularly useful because it permits the dynamic tensions of the support cables to be substantially equalized on both sides of the pivot tower 20 while supporting the support cables 140. In FIG. 1, only one pivot tower 20 is shown. However, it is understood that additional pivot towers 20 could be positioned in the aerial conveyor system 1000.

The pivot tower 20 preferably includes a support structure 202 that can pivot about the base 201 via a pivot structure 203. The pivot tower 20 preferably further includes connection structure 204, which connects the pivot tower 20 to and supports the belt conveyor system 100.

A distance A (see FIG. 1) between the anchor tower 11 and the pivot tower 20 can be significant, such as 600 feet or more. Similarly, a distance B (see FIG. 1) between the anchor tower 31 and the pivot tower 20 can be significant, such as 600 feet or more. The distances A and B can be the same or can be different, depending on the needs of the particular implementation of the aerial conveyor system 1000.

As illustrated in FIG. 1, in one embodiment, a height of the anchor tower 11, the pivot tower 20 and the anchor tower 31 may be different. In another embodiment, the height of two of the anchor tower 11, the pivot tower 20 and the anchor tower 31 may be the same. In yet another embodiment, the height of the anchor tower 11, the pivot tower 20 and the anchor tower 31 are the same. The height of the anchor tower 11, the pivot tower 20 and the anchor tower 31 may be varied, for example, based on a terrain or obstacle being traversed by the aerial conveyor system 1000.

The support cables 140 extend between the anchor towers 11, 31 to hold the pivot tower(s) 20 in position and to support the belt conveyor system 100. For the system shown in FIG. 1, preferably the configuration of the support cables 140 includes a pair of upper support cables 141 (see FIG. 2) and a pair of lower support cables 142 (see FIG. 2). However, for belt conveyor systems intended to convey lighter loads, the configuration of the support cables 140 could be merely two support cables disposed side-by-side (not shown). Using predetermined lengths of support cables 140, the pivot tower 20 can be accurately positioned and maintained in place. The support cables 140 can be any type of cable sufficient for the intended use, but preferably they are wire ropes or wire strands such as a locked-coil rope or strand 140'.

Figure 6:
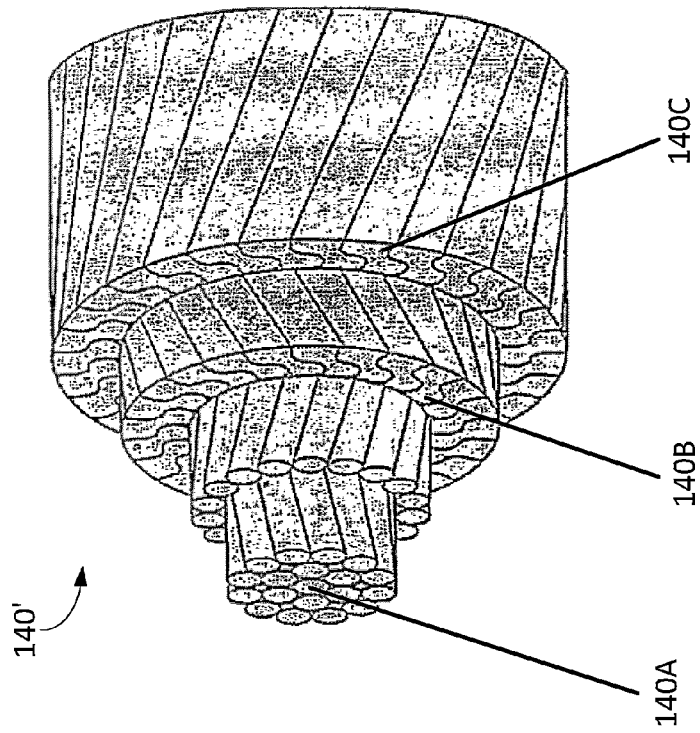
FIG. 6 is a perspective view of an embodiment of a locked-coil rope, which can be used as a support cable that will extend between towers in the aerial conveyor system of FIG. 1.
Figure 7:
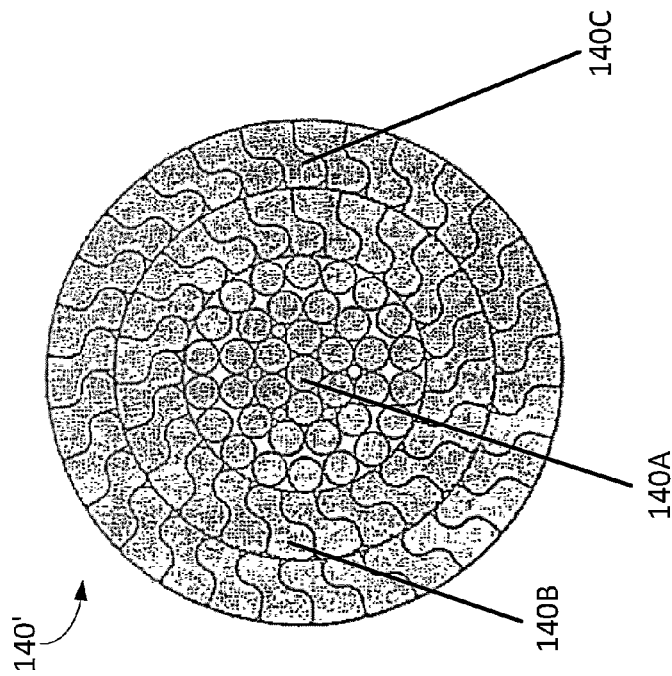
FIG. 7 is a front, cross-sectional view of the locked-coil rope of FIG. 6.

FIGS. 6 and 7 show an example of a locked-coil rope or strand 140', which is particularly advantageous because of its high strength and stiffness-to-weight ratio. Locked-coil ropes 140' are manufactured in several operations. First, a core strand 140A comprising a parallel construction is manufactured. Next, one or more round-wire layers 140B are applied to the core strand 140A in a first direction of lay. Then, one or more profile wire layers 140C are applied in a second direction of lay. The core strand 140A, round-wire layers 140B and profile wire layers 140C are concentric. Although only three layers of wires 140A-140C are illustrated in FIGS. 6 and 7, it is understood that additional layers of wires may be applied onto the core strand 140A in alternate directions of lay. The round-wire layers 140B and the profile wire layers 140C may have a Z-profile. In order to retain their forced helical shape or Z-profile in the locked-coil rope 140', the round-wire layers 140B and the profile wire layers 140C may be preformed in a conventional twisting apparatus prior to closing. Locked-coil ropes 140' reduce stretching and maintain tension over the span of the aerial conveyor system 1000. In addition, locked-coil ropes 140' of twisted design are largely free of torque, allowing rope pull without a guide. Cavities of locked-coil ropes 140' may be filled with grease to avoid internal corrosion that may be caused by condensation of water.

Figure 2:
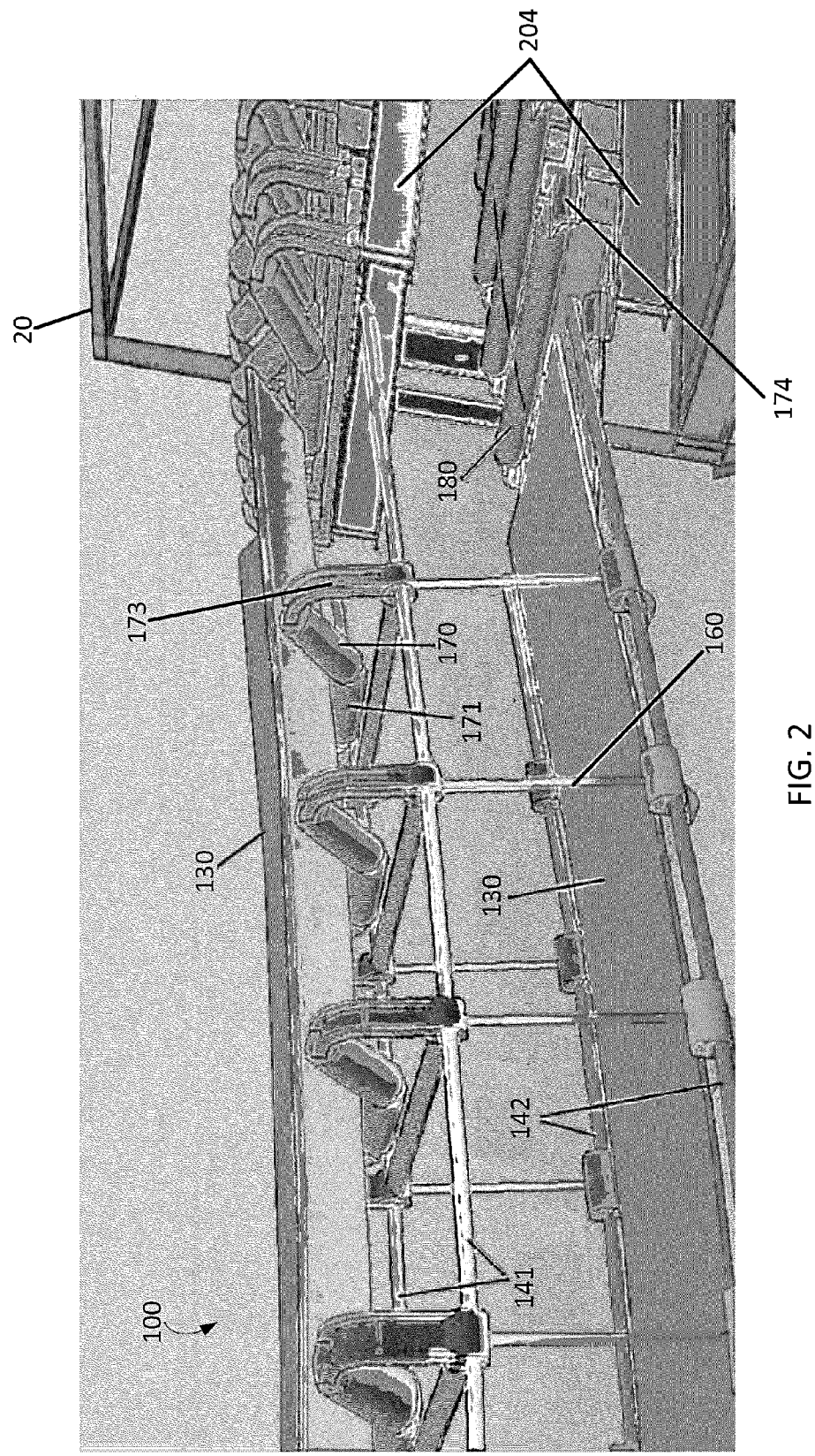
FIG. 2 is a perspective view of an embodiment of a support structure of the aerial conveyor system of FIG. 1.

As shown in FIG. 2, on an upper portion of the belt conveyor 110, the frame 160 can support flat rollers 171 that are substantially horizontal and angled support rollers 170 that have longitudinal directions angled relative to longitudinal directions of the flat rollers 171. For example, the longitudinal directions of the angled support rollers 170 may be angled at approximately 45 degrees relative to the longitudinal directions of the flat rollers 171 (though other angles may be appropriate). The rollers 170, 171 can be supported on frame members 173. This configuration of the rollers 170, 171 causes the belt 130 to be formed into a curved shape, shown more clearly in FIGS. 3-5, that allows the belt 130 to hold the material to be conveyed. As shown in FIG. 2, on a lower portion of the belt conveyor 110, the frame 160 can support return idlers 180, which are substantially horizontal, on frame members 174. These return idlers 180 allow the returning belt 130, which does not have material on it, to be flat while it returns to the loading end. The belt 130 is typically a continuous loop, but portions of the belt 130 are omitted in FIG. 2 to permit viewing of the frame 160, the angled support rollers 170, the flat rollers 171 and the return idlers 180.

The frame 160 can be supported on the towers 11, 20, 31 (anchor and pivot) by connection structure 113, 204, as shown in the right side of FIG. 2. The frame 160 also can be supported on the upper support cable(s) 141 and the lower support cable(s) 142, as also shown in FIG. 2. For example, the frame 160 can be fixed in position on the upper support cable(s) 141 at connection points. In embodiments in which there is only one pair of side-by-side support cables (lighter loads) (not illustrated), the frame 160 could be fully supported by just the pair of side-by-side support cables (in addition to the towers 11, 20, 31).

The aerial conveyor system 1000 according to the present invention can be particularly advantageous. For example, the aerial conveyor system 1000 can be implemented at a relatively lower cost. In addition to reduced installation costs, it can be easier to maintain. It has less support structure than certain other conveyors, thereby requiring less structural steel. The pivot towers 20 allow the aerial conveyor system to span over greater distances with fewer support structures (i.e., anchor towers and pivot towers) and fewer moving parts than a conventional bulk material conveyor system.

The aerial conveyor system 1000 allows for easier installation. For example, it is elevated, and thus can be configured to span roads, railroad crossings, and rough terrain. It allows for taking the shortest overland rout from mine to transfer facility.

The aerial conveyor system 1000 can reduce environmental impact. For example, it can use relatively fewer support towers (i.e., pivot towers), which reduces barriers to wildlife. In addition, it is elevated to span over environmentally sensitive areas, such as wetlands and rivers. Furthermore, the aerial conveyor system 1000 may be electrically powered to avoid harmful emissions to the environment. In addition, the aerial conveyor system 1000 minimizes routine material spill, belt dribble and dust accumulation by using a conveyor belt cleaning wash box located near the discharge end. This cleaning system, along with conveyor belt covers and drip pans, helps maintain belt performance while preventing unwanted accumulations of dust, debris and loose material on mechanical parts during normal operation. Thus, environmental impact of the aerial conveyor system 1000 may be further reduced.

The aerial conveyor system 1000 can convey material overland with desired throughput capacities, such as 1,000, 2,000, 3,000, and 4,000 tons per hour (TPH) and higher, thereby including relatively high throughput capacities.

Operation of the aerial conveyor system 1000 may be frilly automated to optimize production and minimize operation cost.

As utilized herein, the terms "approximately," "about," "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

For the purpose of this disclosure, the term "coupled" means the joining of two members directly or indirectly to one another. Such joining may be stationary or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

It should be noted that the orientation of various elements may differ according to other exemplary embodiments, and that such variations are intended to be encompassed by the present disclosure. It is recognized that features of the disclosed embodiments can be incorporated into other disclosed embodiments.

It is important to note that the constructions and arrangements of the aerial conveyor system or components thereof as shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An aerial conveyor system for transporting bulk materials, the aerial conveyor system comprising:
    a first anchor tower disposed proximate to a loading end;
    a second anchor tower disposed proximate to a discharge end;
    at least one support cable extending between the first anchor tower and the second anchor tower;
    a belt conveyor system extending between the loading end and the discharge end; and
    at least one pivot tower disposed between the first anchor tower and the second anchor tower,
    wherein the at least one pivot tower includes a support structure connected to the at least one support cable, a base and a pivot structure configured to allow the support structure to pivot relative to the base to substantially equalize dynamic tensions of the at least one support cable between the first anchor tower and the pivot tower and the second anchor tower and the pivot tower.

2. The aerial conveyor system of claim 1, wherein the first and the second anchor towers are rigidly fixed in position and configured to support the at least one support cable and the belt conveyor system.

3. The aerial conveyor system of claim 1, wherein the at least one support cable includes a plurality of support cables comprising:
    a pair of upper support cables; and
    a pair of lower support cables.

4. The aerial conveyor system of claim 1, wherein the at least one support cable is a locked-coil rope comprising a core strand and additional layers of wires applied onto the core strand in alternate directions of lay.

5. The aerial conveyor system of claim 1, wherein the belt conveyor system comprises a a continuous loop conveyor belt configured to hold the bulk materials to be transported, a belt conveyor configured to drive the continuous loop conveyor belt and a frame configured to support the belt conveyor.

6. The aerial conveyor system of claim 5, wherein an upper portion of the belt conveyor comprises a plurality of flat rollers and a plurality of angled support rollers that have longitudinal directions angled relative to longitudinal directions of the plurality of flat rollers, the plurality of angled support rollers and the plurality of flat rollers configured to form the continuous loop conveyor belt into a curved shape for holding the bulk materials.

7. The aerial conveyor system of claim 5, wherein the longitudinal directions of the plurality of angled support rollers are angled at approximately 45 degrees relative to the longitudinal directions of the plurality of flat rollers.

8. The aerial conveyor system of claim 5, wherein a lower portion of the belt conveyor comprises a plurality of support return idlers, the support return idlers being substantially horizontal such that when the continuous loop conveyor belt is returning to the load end without bulk materials, the continuous loop conveyor belt is substantially flat.

9. The aerial conveyor system of claim 5, further comprising:
   a first return belt rotator disposed at the loading end; and
   a second return belt rotator disposed at the discharge end,
   wherein the first and the second return belt rotators are configured to rotate the continuous loop conveyor belt and return the continuous loop conveyor belt to a normal position.

10. The aerial conveyor system of claim 5, further comprising a counter weight provided at the discharge end, the counter weight configured to provide a constant, desired belt tension of the continuous loop conveyor belt.

11. The aerial conveyor system of claim 1, wherein the bulk materials transported comprise at least one of coal, gold, iron ore, aggregates or cargo.

12. The aerial conveyor system of claim 1, wherein the aerial conveyor system is configured to transport bulk materials overland with a high throughput capacity of at least 1,000 tons per hour.

13. The aerial conveyor system of claim 1, wherein the first anchor tower, the at least one pivot tower and the second anchor tower are provided at different heights.

14. The aerial conveyor system of claim 1, wherein a distance between the at least one pivot tower and any one of the first and the second anchor towers is greater than or equal to 600 feet.

15. A method of aerially transporting bulk materials with reduced environmental impact, the method comprising:
   loading the bulk materials onto a belt conveyor system at a loading end;
   conveying the bulk materials from a first anchor tower disposed proximate to the loading end to a second anchor tower disposed proximate to a discharge end via the belt conveyor system and at least one support cable extending between the first anchor tower and the second anchor tower;
   providing at least one pivot tower between the first and the second anchor towers, the at least one pivot tower including a support structure connected to the at least one support cable, a base and a pivot structure;
   substantially equalizing dynamic tensions of the at least one support cable between the first anchor tower and the at least one pivot tower and the second anchor tower and the at least one pivot tower by pivoting the support structure to pivot relative to the base via the pivot structure of the at least one pivot tower; and
   discharging the bulk materials from the belt conveyor system at the discharge end.

16. The method of claim 15, wherein the conveying comprises forming a continuous loop conveyor belt of the belt conveyor system into a curved shape to facilitate holding the bulk materials by disposing the continuous loop conveyor belt upon a plurality of flat rollers and a plurality of angled support rollers that have longitudinal directions angled relative to longitudinal directions of the plurality of flat rollers.

17. The method of claim 16, wherein the longitudinal directions of the plurality of angled support rollers are angled at approximately 45 degrees relative to the longitudinal directions of the plurality of flat rollers.

18. The method of claim 16, further comprising rotating, by a return belt rotator, the continuous loop conveyor belt at the discharge end and disposing the conveyor continuous loop belt upon a plurality of substantially horizontal support return idlers such that when the continuous loop conveyor belt is returning to the load end without bulk materials, the continuous loop conveyor belt is substantially flat.

19. The method of claim 15, wherein the bulk materials are conveyed a throughput capacity of at least 1,000 tons per hour.

20. The method of claim 15, wherein the at least one pivot tower is provided at a distance of greater than or equal to 600 feet from any one of the first and the second anchor towers.

* * * * *

UNITED STATES PATENT AND TRADEMARK OFFICE
CERTIFICATE OF CORRECTION

PATENT NO. : 8,763,791 B2
APPLICATION NO. : 13/601750
DATED : July 1, 2014
INVENTOR(S) : Jeffrey A. Conroy et al.

Page 1 of 1

It is certified that error appears in the above-identified patent and that said Letters Patent is hereby corrected as shown below:

IN THE SPECIFICATION

Col. 1, line 38, "harrier" should be -- barrier --; and

Col. 5, line 36, "frilly" should be -- fully --.

IN THE CLAIMS

Col. 6, line 62, "a" second occurrence should be deleted.

Signed and Sealed this
Twelfth Day of May, 2015

Michelle K. Lee
*Director of the United States Patent and Trademark Office*